United States Patent
Clancy et al.

(10) Patent No.: US 11,743,208 B2
(45) Date of Patent: Aug. 29, 2023

(54) OPTIMIZING AGENT FOR IDENTIFYING TRAFFIC ASSOCIATED WITH A RESOURCE FOR AN OPTIMIZED SERVICE FLOW

(71) Applicant: ARRIS Enterprises LLC, Suwanee, GA (US)

(72) Inventors: Paul A. Clancy, Duluth, GA (US); Ian G. Wheelock, Cork (IE)

(73) Assignee: ARRIS ENTERPRISES LLC, Suwanee, GA (US)

(*) Notice: Subject to any disclaimer, the term of this patent is extended or adjusted under 35 U.S.C. 154(b) by 0 days.

(21) Appl. No.: 17/512,839

(22) Filed: Oct. 28, 2021

(65) Prior Publication Data
US 2022/0150183 A1    May 12, 2022

Related U.S. Application Data

(60) Provisional application No. 63/112,896, filed on Nov. 12, 2020.

(51) Int. Cl.
*H04L 47/80* (2022.01)
*H04L 47/762* (2022.01)

(52) U.S. Cl.
CPC .......... *H04L 47/805* (2013.01); *H04L 47/762* (2013.01); *H04L 47/801* (2013.01)

(58) Field of Classification Search
CPC .... H04L 47/805; H04L 47/762; H04L 47/801
See application file for complete search history.

(56) References Cited

U.S. PATENT DOCUMENTS

| | | | |
|---|---|---|---|
| 2007/0168466 A1* | 7/2007 | Tooley | H04L 67/02 709/218 |
| 2011/0016499 A1 | 1/2011 | Liu et al. | |
| 2013/0223208 A1* | 8/2013 | Liao | H04L 41/5054 370/229 |
| 2015/0222527 A1* | 8/2015 | Shah | H04L 47/2416 370/338 |
| 2018/0183684 A1* | 6/2018 | Jacobson | H04L 47/821 |
| 2018/0262359 A1 | 9/2018 | Wu | |

(Continued)

OTHER PUBLICATIONS

International Search Report and the Written Opinion of the International Searching Authority dated Feb. 23, 2022 in International (PCT) Application No. PCT/US2021/056991.

(Continued)

*Primary Examiner* — Joe Chacko
(74) *Attorney, Agent, or Firm* — Wenderoth, Lind & Ponack, L.L.P.

(57) ABSTRACT

An optimizing agent of an access point device can identify traffic associated with a resource for an optimized service flow so as to provide a user an enhanced experience. The optimizing agent can identify the traffic for the optimized service flow based on one or more optimizations settings. The optimization settings can include a policy that indicates a priority level, a bandwidth, a QoS, or any other prioritization setting. A user can manage a list of resources associated with the one or more optimization settings via a user interface either hosted by a network resource or network device such that traffic associated with the resources should receive optimization.

20 Claims, 10 Drawing Sheets

(56) References Cited

U.S. PATENT DOCUMENTS

2019/0356498 A1* 11/2019 Hernandez Sanchez ................... H04L 43/0894
2021/0243131 A1* 8/2021 Wheelock ........... H04L 61/2514

OTHER PUBLICATIONS

International Preliminary Report on Patentability and Written Opinion dated May 25, 2023 in International Application No. PCT/US2021/056991.

* cited by examiner

OPTIMIZING AGENT FOR IDENTIFYING TRAFFIC ASSOCIATED WITH A RESOURCE FOR AN OPTIMIZED SERVICE FLOW

BACKGROUND

Cable service providers, which are also referred to as Multiple System Operators ("MSO"), typically transmit analog and digital video broadcast television signals, as well as broadband data services, to their customers. These broadband data services typically include Internet access using the Data Over Cable Service Interface Specification ("DOCSIS") protocol. To provide television and data Services, a MSO typically uses a Cable Modem Termination System Currently NAT is used to cope with Internet Protocol Version Four ("IPv4") address exhaustion as well as minimizing the number of exposed IP ("Internet Protocol") addresses that may be present within a network. In the case of Internet Service Providers ("ISPs"), broadband gateways assign local IP addresses from a pre-configured IP subnet for local devices. The assigned IP addresses are different to the external Wide Area Network ("WAN") IP address the ISP uses for the broadband gateway itself, which is typically provided using the ISP Dynamic Host Configuration Protocol ("DHCP") system. Traffic from local devices going to the internet are transformed using Network Address Port Translation ("NAPT" or "NAT" for short), whereby their assigned IP addresses are replaced by the gateway WAN IP address, and the source Transmission Control Protocol ("TCP") or User Datagram Protocol ("UDP") port numbers are replaced with available allocations from the NAT function. For a Source ("SRC"), the NAT function retains this SRC_IP+SRC_port to WAN_IP+NEW_SRC_port mapping, and when the broadband gateway receives traffic sent to WAN_IP+NEW_SRC_port, it is able to replace it with the recorded NAT mapping, and relays the traffic to the local device.

The use of NAT typically means that the IP address of local devices are "obfuscated," and are extremely difficult to resolve without the NAT mapping information. As a result, when Broadband Network Gateways ("BNG") or DOCSIS CMTS devices that connect broadband gateways to the Internet, all they see are the so-called WAN IP addresses of the gateways—effectively only being able to provide QoS to the gateway itself, and not the individual devices behind it.

There are ways of dynamically signaling the BNG/CMTS function, but given the ephemeral nature of TCP and UDP traffic flows, constantly updating the BNG/CMTS with new 5-tuple information for a flow is not scalable. Accordingly, there is a need for way to enable a simpler configuration of the BNG/CMTS QoS and classification system in order to allocate QoS to IP devices behind the broadband gateway in a scalable way.

Additionally, certain applications or dedicated network devices may require a higher priority level or bandwidth. These applications may not function or operate as expected by a user of the network device when traffic associated with these applications does not receive prioritization over other network traffic. Delays in communication between these applications and a network resource can cause many issues with the function and operation of these applications. Thus, there is a need to provide a low-latency for certain identified applications to enhance a user's experience and to ensure that these applications function or operate properly.

SUMMARY

As described herein is a network and method for connecting devices on a Local Area Network ("LAN") to the Internet via a Network Address Translation ("NAT") enabled gateway and a server. The gateway includes an Internet address for enabling the gateway to be addressed by the server and the LAN. A plurality of ports on the gateway enables the gateway to receive and transmit data to and from the server and the LAN. A processor divides the ports on the gateway into at least a first range of port numbers and a second range of port numbers. Classified traffic identified as suitable for a higher level of QoS is assigned to the first range of port numbers, and classified traffic identified as suitable for a lower level of QoS is assigned to the second range of port numbers. The gateway provides devices on the LAN with a level of QoS depending upon the port numbers to which they are assigned. The ports on the gateway may be divided into a third range of port numbers to provide an additional level of QoS. It should be noted that the number N of ranges of port numbers is not limited to two or three, but can be nearly any number N which is substantially greater than two (e.g., dozens or even hundreds).

The improved NAT process described herein provides a NAT enabled network the ability to identify devices or traffic flows from devices within the home network that need special QoS treatment, such as low-latency, or high bandwidth. The NAT enabled network splits or defines ranges of TCP and UDP ports associated a WAN_IP address which can be used for local high priority purposes. The improved NAT process is also able to ensure that a local broadband gateway, in combination with a BNG/CMTS can deliver this enhanced QoS without requiring significant non-stop QoS signaling across the broadband network.

Additionally, one or more optimization settings associated with an optimization service or an optimizing agent can indicate a priority level for traffic associated with one or more applications, one or more network devices, such as dedicated network devices, or a combination thereof. The priority can be associated with a level of QoS such that certain application(s) and/or network device(s) have a higher priority than other application(s) and/or network device(s). For example, traffic associated with a gaming application that requires a higher bandwidth for proper execution can be given a higher priority or a higher level of QoS than general Internet traffic.

An aspect of the present disclosure provides a method for an optimizing agent of an access point device to provide traffic associated with a resource an optimized service flow. The method comprises establishing a connection to an optimizing service, receiving an optimization notification associated with the resource, modifying one or more optimization settings of the access point device based on the optimization notification to indicate a prioritization of the traffic associated with the resource, and identifying the traffic for the optimized service flow based on the one or more optimization settings.

In an aspect of the present disclosure, the method is such that at least one of the one or more optimization settings comprises a policy associated with the resource.

In an aspect of the present disclosure, the method further comprises receiving a request from a client device for a list of non-optimized client applications, receiving an optimization notification from the client device, wherein the optimization notification comprises a selected client application from the list of non-optimized client applications, and, providing a list of optimized client applications to the client device, wherein the list of optimized client applications includes the selected client application.

In an aspect of the present disclosure, the method is such that the optimization notification is received from a user interface of the client device.

In an aspect of the present disclosure, the method is such that the optimization notification comprises a voice command received from the user interface.

In an aspect of the present disclosure, the method is such that modifying the one or more optimization settings comprises assigning the traffic associated with the resource to a level of Quality of Service (QoS).

In an aspect of the present disclosure, the method is such that updating the one or more remote optimization settings comprises updating an optimization repository of a network resource.

An aspect of the present disclosure provides an optimizing agent of an access point device for identifying traffic associated with a resource for an optimized service flow. The access point device comprises a memory storing one or more computer-readable instructions, a processor configured to execute the one or more computer-readable instructions to establish a connection to an optimizing service, receive an optimization notification associated with the resource, modify one or more optimization settings of the access point device based on the optimization notification to indicate a prioritization of the traffic associated with the resource, and identify the traffic for the optimized service flow based on the one or more optimization settings.

In an aspect of the present disclosure, at least one of the one or more optimization settings comprises a policy associated with the resource.

In an aspect of the present disclosure, the processor is configured to execute one or more further instructions to receive a request from a client device for a list of non-optimized client applications, receive an optimization notification from the client device, wherein the optimization notification comprises a selected client application from the list of non-optimized client applications, and provide a list of optimized client applications to the client device, wherein the list of optimized client applications includes the selected client application.

In an aspect of the present disclosure the optimization notification is received from a user interface of the client device.

In an aspect of the present disclosure, the optimization notification comprises a voice command received from the user interface.

In an aspect of the present disclosure, modifying the one or more optimization settings comprises assigning the traffic associated with the resource to a level of Quality of Service (QoS).

In an aspect of the present disclosure, updating the one or more remote optimization settings comprises updating an optimization repository of a network resource.

An aspect of the present disclosure provides a non-transitory computer-readable medium storing one or more instructions for identifying traffic associated with a resource for an optimized service flow. The one or more instructions when executed by a processor of an access point device, cause the access point device to perform one or more operations of the method discussed above.

The above-described network device(s) or electronic apparatus(es), such as access point devices, extender access point devices, client devices and any other network devices, may be implemented as any of a residential network access point device, an electronic device (for example, a mobile phone, a computing device such as a notebook computer, or both) according to one or more embodiments.

Thus, according to various aspects of the present disclosure described herein, it is possible to select a path by remapping the source port in order to identify a resource for an optimized service flow based on a device or application, for example, as selected from a user interface.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
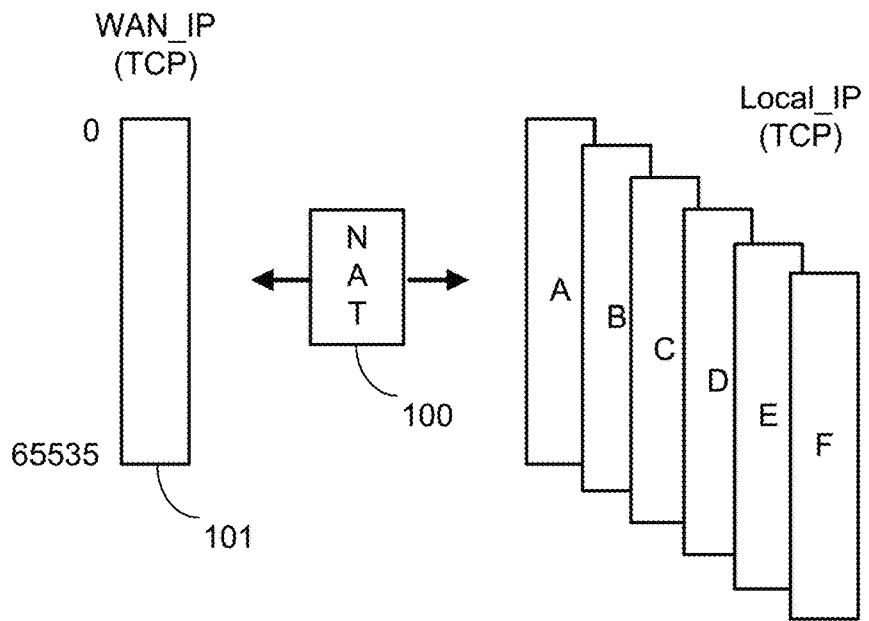
FIG. 1 is an illustration of a normal NAT process for translating the network addresses of a plurality of home network devices A, B, C, D, E, and F having Local_IP addresses, and also illustrated is a WAN_IP address and its associated port numbers.

Referring now to FIG. 1, the figure illustrates a normal NAT process 100 for a plurality of devices A, B, C, D, E, and F having Local_IP addresses and a WAN_IP address and its associated port numbers 101. The WAN_IP address is typically associated with port numbers that range from 0 through 65535. The plurality of local devices A, B, C, D, E, and F are each assigned a local_IP address. The WAN_IP address and port numbers 101, as well as the Local_IP addresses for the devices A, B, C, D, E, and F are preferably configured to comply with TCP. Basically, within a home network, NAT works on the basis of mapping all TCP and UDP traffic from local devices, such as A, B, C, D, E, and F to allocated TCP and UDP port numbers attached to the WAN_IP address 101. The allocation of such ports is arbitrary.

Figure 2:
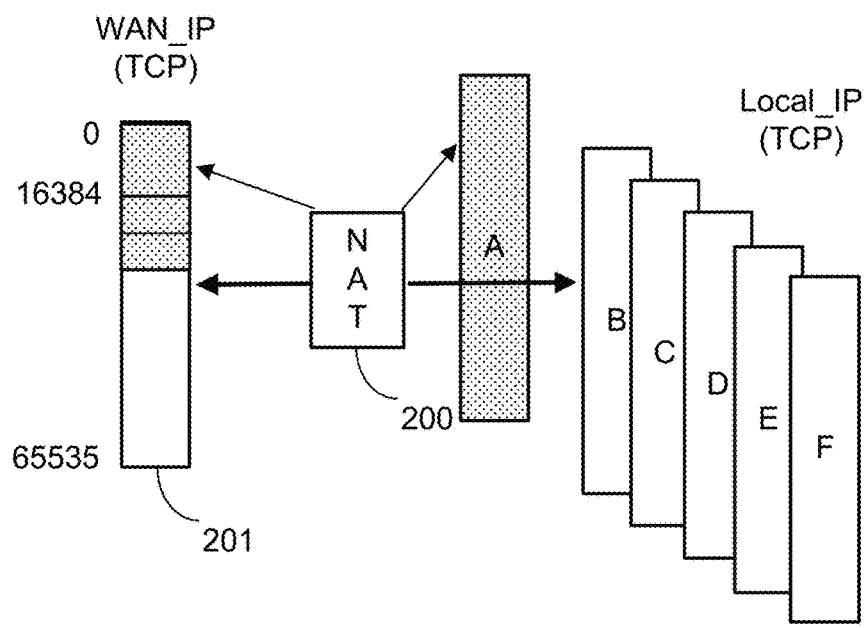
FIG. 2 is an illustration of an improved NAT process for translating the network addresses of a plurality of home network devices A, B, C, D, E, and F having Local_IP addresses, and also illustrated is a WAN_IP address and its associated port numbers.

Referring now to FIG. 2, the figure illustrates an improved NAT process 200 that includes a plurality of devices A, B, C, D, E, and F having Local_IP addresses and a WAN_IP address and its associated port numbers 201. The improved NAT process 200 changes the arbitrary allocation of the normal NAT process 100 so that defined ranges of TCP and UDP ports associated with the WAN_IP address 201 can be used for local high priority purposes, and these defined ranges notified to a BNG/CMTS. From a BNG/CMTS perspective the TCP/UDP port space is partitioned into ranges that can in turn be mapped to explicit QoS allocations. In FIG. 2, the port space is preferably partitioned into at least a first range of 0 to 16,384 and a second range of 16,385 to 65,535. If desired, the second range can be further partitioned.

Figure 3:
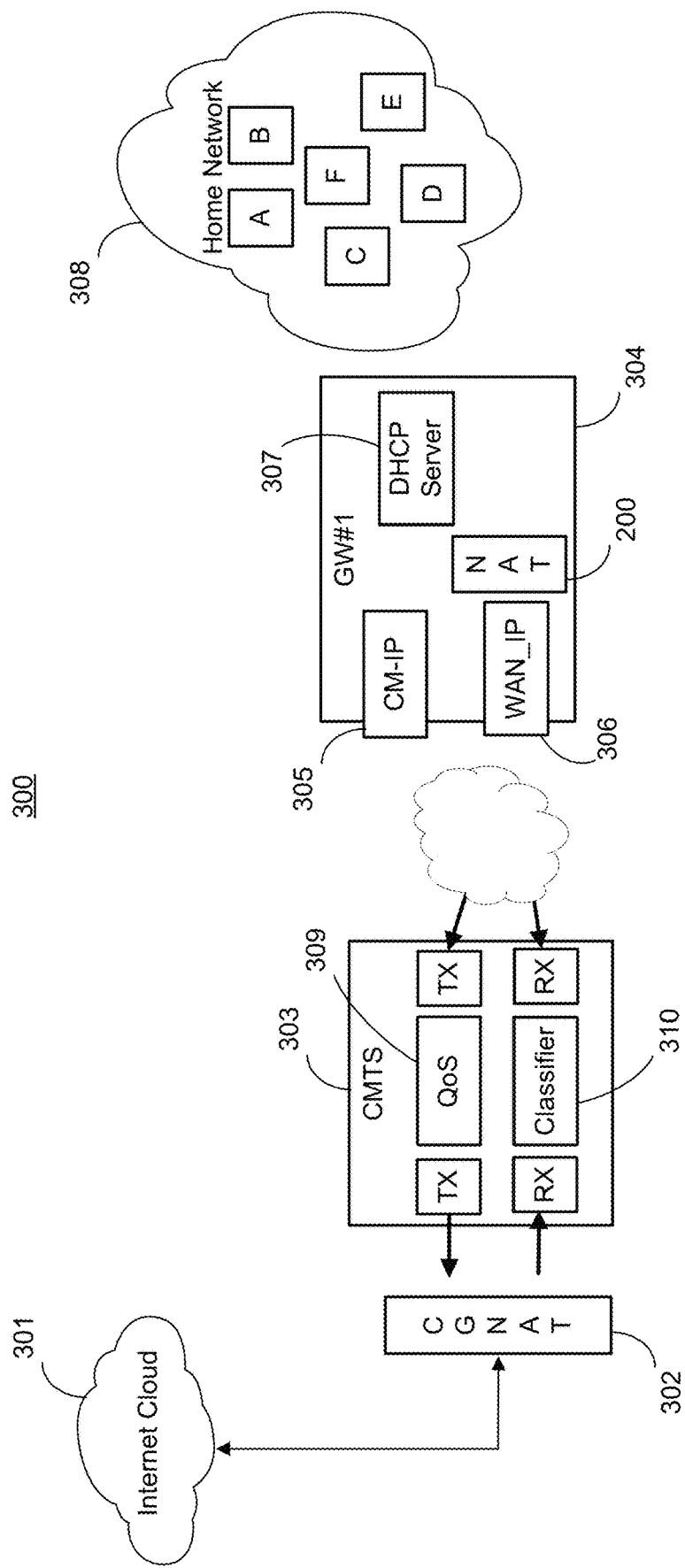
FIG. 3 is an illustration of a network that utilizes the improved NAT process of FIG. 2.

Referring now to FIG. 3, the figure illustrates a network 300 that utilizes the improved NAT process 200 of FIG. 2. The network 300 is connected to the Internet Cloud 301 via a Commercial Grade Network Address Translation ("CG-NAT") device 302 which transmits and receives data to and from a Cable Modem Termination System ("CMTS") 303. A QoS engine 309 and a classifier 310 are included within the CMTS 303 which transmits and receives data to and from a gateway 304. The gateway 304 includes a cable modem_IP address 305, a WAN_IP address 306, the improved NAT process 200 of FIG. 2, and a DHCP server 307. In FIG. 3, the DHCP server 307 is able to communicate with a home network 308 which includes devices A, B, C, D, E, and F having local_IP addresses; A=10.0.0.11, 8=10.0.0.12, C=10.0.0.13, D=10.0.0.14, E=10.0.0.15, and F=10.0.0.17, for example.

It should be noted that the CMTS 303 has information about WAN_TP address 306 and the CM_IP address 305 of the gateway 304, and has no information about the home network 308. It should be further noted that the QoS engine 309 and classifier 310 include information relating to the Media Access Control ("MAC") address of the gateway 304; a primary quality of service, such as Pri_SF=1 Mbps; a secondary quality of service, such as Sec_SF=40 Mbps; and can classify the WAN_IP address 306 of the gateway 304. To expose the QoS of the devices in home network 308 to the CMTS 303, classifiers are added to the Sec_SF information, based on the TCP/UDP port range 0-16k, where "k" represents 1024. In order to provide extra service to the home network 308, it may also be desirable to split the NAT TCP/UDP port space using the range 0-16 k for specific addresses in the home network 308, and using the range 16 k to 64 k (or 65535) for all other IP addresses.

The assignment of traffic in the local home network 308 to the NAT TCP/UDP port ranges can be based on multiple traffic classifiers if required. For instance, a simple option is to assign an explicit IP address to use the reserved TCP/UDP port range, thus ensuring that all traffic for a specific device in the home network would get differentiated QoS. Another approach could be to use specific differentiated services code point (DSCP) markings in packets to use the reserved TCP/UDP port range. Multiple TCP/UDP port ranges could also be identified to enable multiple QoS levels to be supported by the BNG/CMTS 303. In terms of being able to classify traffic to identify if a device or a protocol requires higher QoS, then this is preferably achieved through a user interface that is exposed to a user to pick out priorities for different devices/services/etc. Alternatively, it could be offered through service provider policies, e.g., ensuring World of Warcraft games get high QoS.

Figure 4:
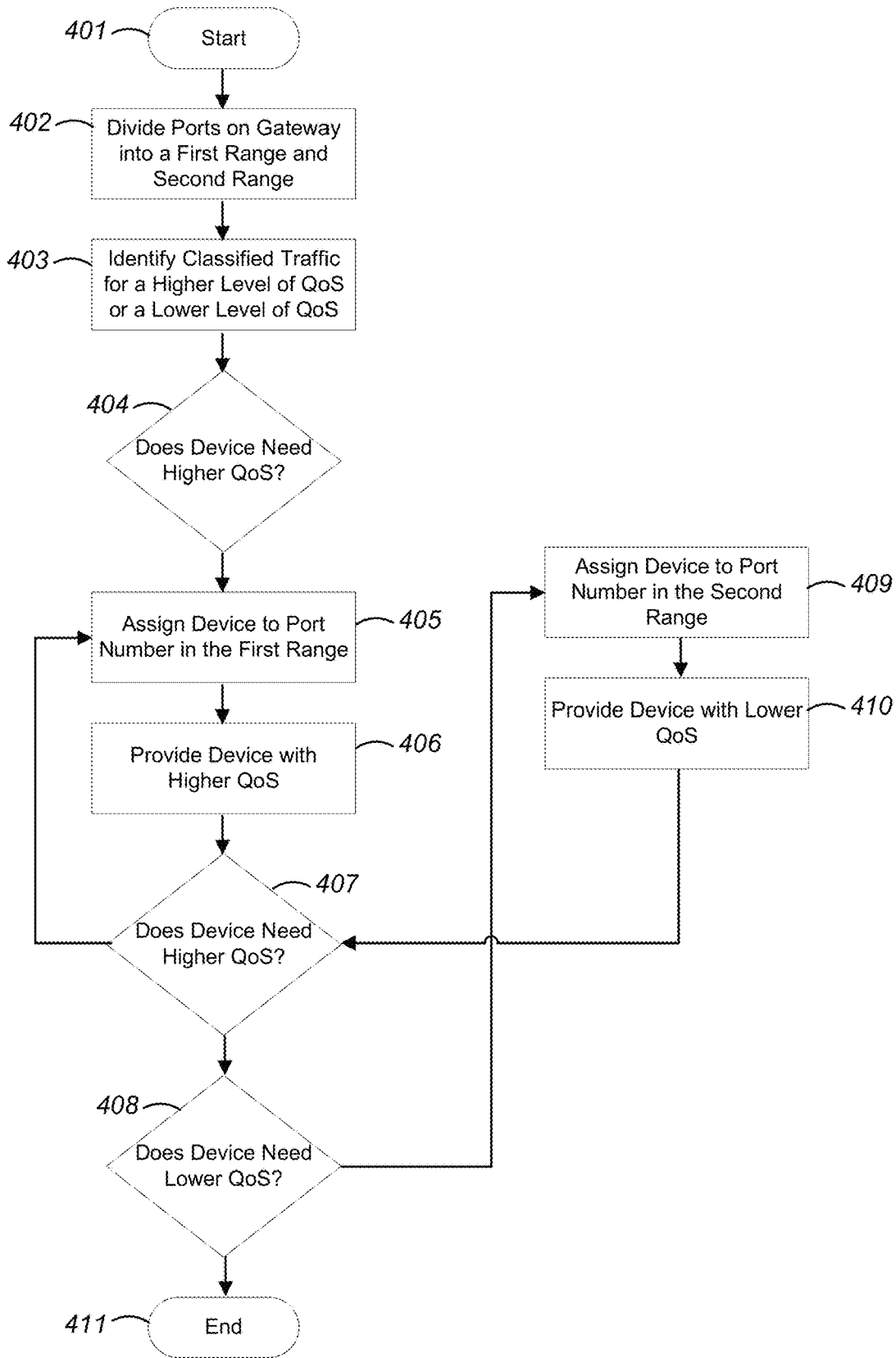
FIG. 4 is a flow diagram of how a gateway provides at least a minimum of two different levels of QoS to the home network devices, but the number of QoS levels can be substantially greater than the minimum of two (e.g., dozens or even hundreds)

Referring now to FIG. 4, a flow diagram illustrates of how the gateway 304 provides different levels of QoS to a home network device in the Home Network 308. The starting step 401 initiates the process, and in step 402, the port numbers of the gateway 304 are divided into at least first and second ranges as shown in FIG. 2. In step 403, the classified traffic from CMTS 303 is identified as being suitable for either a higher level of QoS or a lower level of QoS, which can be further divided into third, fourth etc. and/or subranges, depending on implementation. In step 404, a determination is made whether a particular device needs a higher level of QoS. In step 405, if the traffic to the device is suitable for a higher level of QoS, then the device is assigned to the first range of port numbers, and in step 406, the device is provided with a higher level of QoS. For example, a user can select a device, such as from a list of devices or entered as a device identifier associated with a device, using a user interface. The selected device can be a dedicated device that requires a higher level of QoS, for example, a gaming device. If in step 404, a determination is made that the traffic to the device is not suitable for a higher level of QoS, then in step 409, the device is assigned to the second range of port numbers, and in step 410, the device is provided with a lower level of QoS. Periodically, in step 407, a determination is made whether device needs a higher level of QoS. If the device continues to need a higher level of QoS, then it continues to be assigned to the first range of port numbers. If it is determined that the device no longer needs a higher level of QoS, then a determination is made in step 408 whether the device should be switched to a lower level of QoS, and if so, it is assigned to a port number in the second range of port numbers. The process continues until the end step 411.

Referring again to FIG. 2, it can be appreciated that the improved NAT process 200 allocates ports from 0-16K for IP addresses mapped into High Priority or a higher level of QoS. All other IP addresses are mapped into the remaining 16K-64K of port spaces. Exposing the port space 0-16K for Classification allows tacit knowledge of home network 308 to be shared with the CMTS 303. Other traffic classification in the home could be used to map traffic to the reserved TCP/UDP port range. Multiple TCP/UDP port ranges could be defined in the NAT wan_ip to enable multiple different QoS levels.

Figure 5:
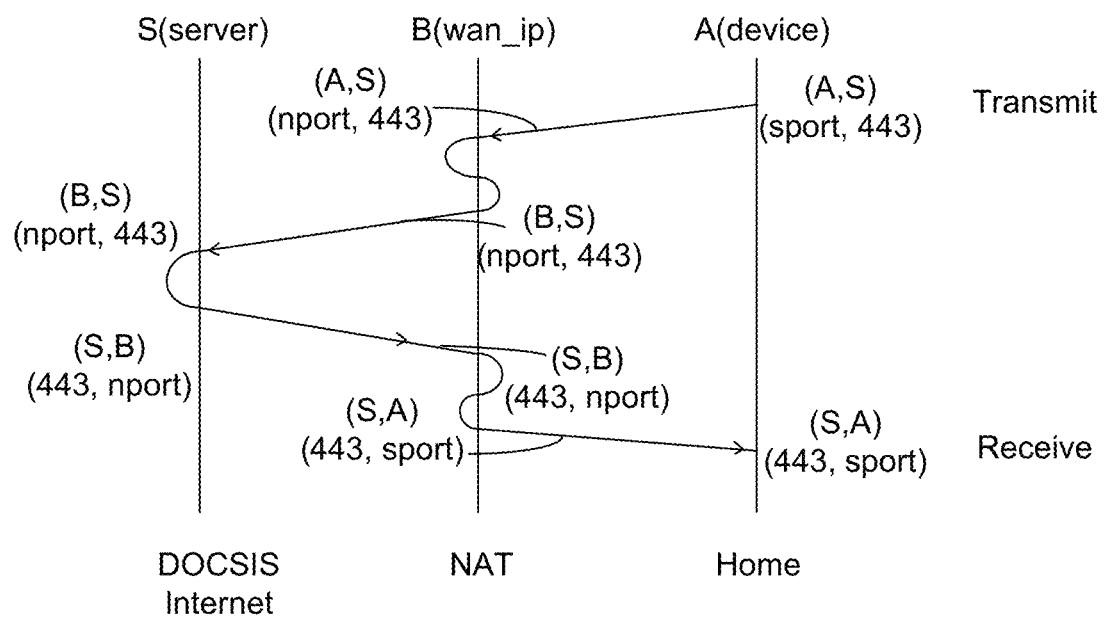
FIG. 5 is a diagram of how the NAT process interacts with a server, a gateway, and a home network device, and it illustrates how a minimum level of at least two levels of QoS to the home network device can be provided.

Referring now to FIG. 5, there is a diagram that illustrates how the improved NAT process 200 interacts with the CMTS 303, the gateway 304, and the home network device A which is part of the home network 308 to provide higher levels of QoS to the home network devices. In the specific example illustrated in FIG. 5, the following actions take place:

- Device A talks to {S,443} port of the gateway 304 using {A,sport} port of device A. For example, device A transmits to the gateway 304, a message from A(device_ip) to S(server_ip) with source port (sport), destination port (dport) 443.
- The traffic from device A is translated using the improved NAT process 200 at gateway 304 or B (wan_ip) from {A, sport} to {B, nport}. For example, the traffic from device A is translated using the improved NAT process 200 at gateway 304 and forwarded to S(server_ip) from B(wan_ip) by remapping or changing source port (sport) to source port (nport) and destination port 443.
- The traffic is then received and responded to by CMTS 303 or S(server).
- CMTS 303 or S(server) transmits traffic downstream to {B, nport} of the gateway 304 or B (wan_ip). In the response the ports destination/source are swapped. The downstream is transmitted to B(wan_ip) with source port 443 and destination nport.
- The gateway 304 or B(wan_ip) deNATs traffic and sends it from {S,443} to {A, sport}. For example, the gateway 304 or B(wan_ip) deNATs traffic and sends it to A(device_ip) with source port 443 and destination port sport.
- If choice of {nport} is limited to a range as explained above, then it is possible to expose this limit to the QoS engine 309 of CMTS 303.
- Using a US Classifier can map traffic using SPORT range to a specific priority or US service flow.
- Using a DS Classifier can map traffic using DPORT range to a specific priority or DS service flow.
- DS Classifier can ignore IP, but it would be better to dynamically add wan_ip (B) as DS DSTIP.
- Selection of home classifiers (IP only, service type, DSCP, other) can be used to select NPORT range to use which may be an extension of existing WiFi.

A major advantage of the network 300 having the improved NAT process 200 is the ability to identify devices or traffic flows from devices within the home network 308 that need special QoS treatment, such as low-latency, or high bandwidth, and be able to ensure that the local broadband gateway, in combination with the BNG/CMTS 303 can deliver this without requiring significant non-stop QoS signaling across the broadband network.

Computer System Architecture

Figure 6:
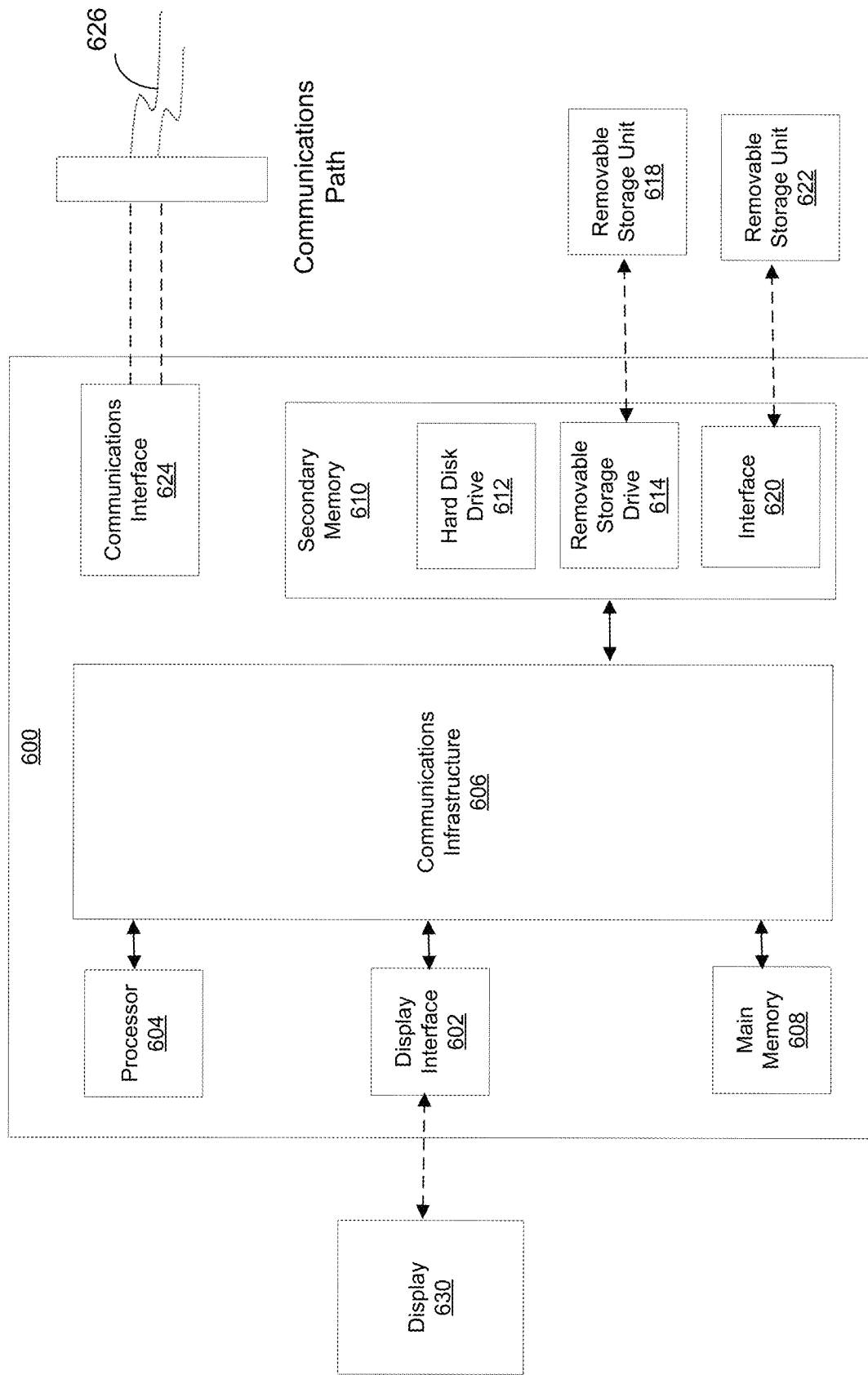
FIG. 6 illustrates a representative computer system 600 in which embodiments of the present disclosure, or portions thereof, may be implemented as computer-readable code.

FIG. 6 illustrates a representative computer system 600 in which embodiments of the present disclosure, or portions thereof, may be implemented as computer-readable code. For example, the gateway 304 and the CMTS 303 of FIG. 3 may be implemented in whole or in part by a computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods and steps of the present disclosure.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this representative computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SOL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 2-11, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Figure 7:
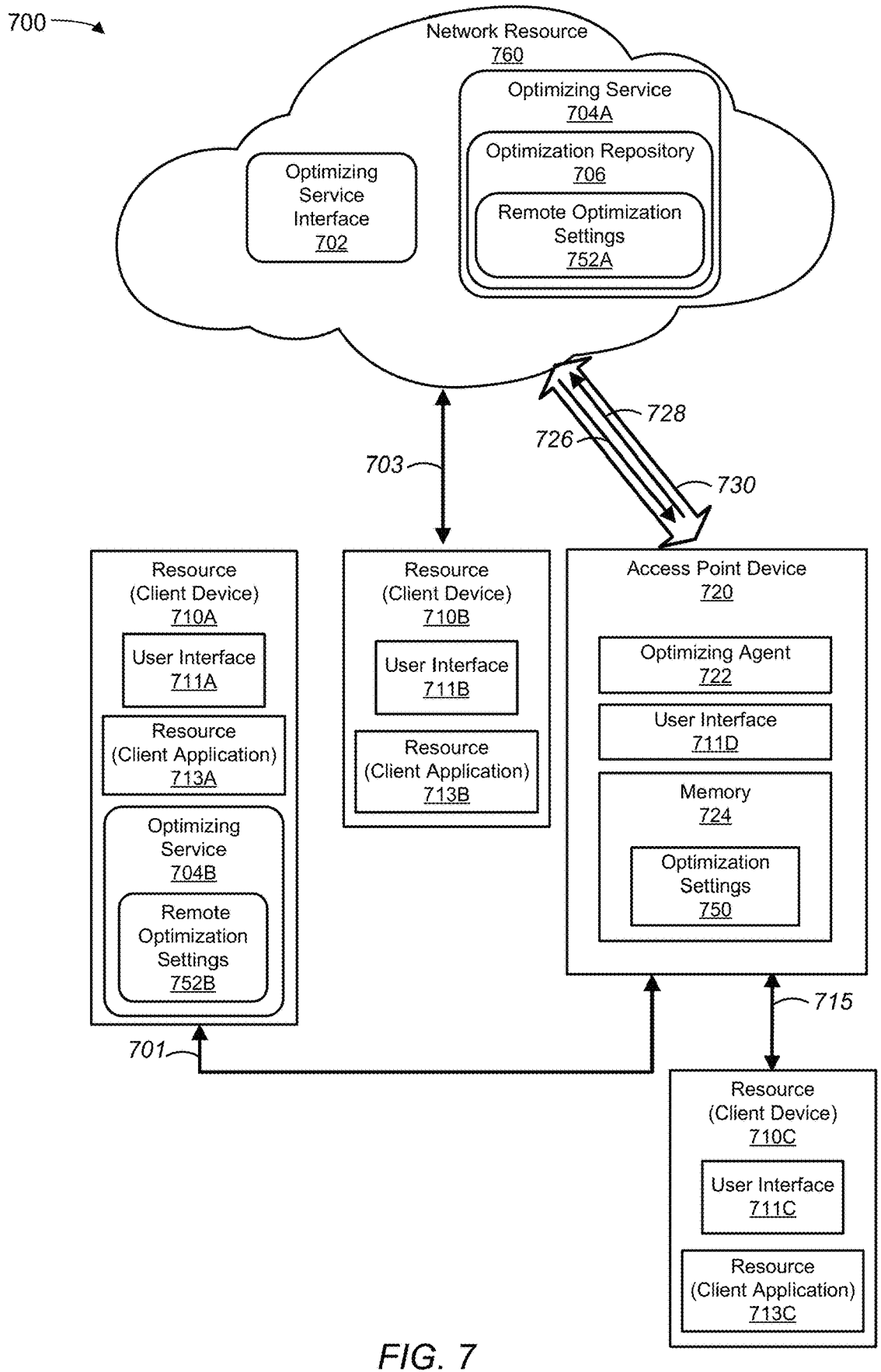
FIG. 7 is a block diagram of a network environment for providing an optimization flow, according to one or more aspects of the present disclosure.

FIG. 7 is a block diagram of a network environment 700 for providing an optimization flow, according to one or more aspects of the present disclosure. Network environment 700 can comprise a network resource 760, an access point device 720, and one or more resources. In one or more embodiments, the one or more resources can comprise a client device 710, a client application 713, or both. The network resource 760 can be coupled to an access point device 720 via a connection 730. A network resource 760 is coupled to one or more client devices 710, for example, client device 710A, a client device 710B, and a client device 710C so as to provide bidirectional communication between the network resource 760 and the one or more client devices 710, for example, via connection 701 to client device 710A, connection 703 to client device 710B, and access point device 720 to client device 710C.

A network resource 760 can comprise any one or more components of the representative computer system 600 of FIG. 6. The network resource 760 can include an optimizing service interface 702 and an optimizing service 704A. The optimizing service interface 702 can be an interface for sending and/or receiving data to and/or from one or more other network devices, for example, a client device 710 and an access point device 720. For example, in one or more embodiments, the optimizing service interface 702 can receive one or more requests associated with optimization of a resource from a user interface at one or more client devices 710 or an access point device 720 in the network environment 700. The one or more requests can include a voice command, a user input, any other instruction, or a combination thereof.

The optimizing service 704A interfaces with the optimizing service interface 702 to receive one or more requests from the one or more network devices 710 or an access point device 720 in the network environment 700. The optimizing service 704A can include an optimization repository 706 for storing one or more remote optimization settings 752A. The one or more remote optimization settings 752A can include a policy, a resource identifier, a destination port, any other optimization setting 750, or a combination thereof. The policy can include a priority level setting, a bandwidth setting, a QoS level, any other setting, or a combination thereof for traffic associated with one or more resources, such as client applications 713, one or more network devices 710, 720, such as one or more dedicated network devices, or a combination thereof. The optimizing service interface 702 can receive one or more optimization settings 750 or remote optimization settings 752B, for example, from a user interface 711 of any one or more network devices, such as from user interface 711D via access point device 720, respectively. The optimizing service interface 702 can send the one or more optimization settings 750 to the optimizing service 704 for storing as one or more remote optimization settings 752A in the optimization repository 706. The one or more optimization settings 750 are associated with a resource such that traffic associated with the resource receives optimization, for example, the traffic is identified for an optimized service flow.

The client devices 710A, 710B, 710C (collectively, client devices 710) can comprise any one or more components of the representative computer system 600 of FIG. 6, a user interface 711, such as user interfaces 711A, 7111B, 711C, respectively, and client applications 713, such as client applications 713A, 713B, 713C, respectively. A user can utilize any one or more of the user interfaces 711 to create, update, alter, modify or otherwise change any one or more optimization settings 750, one or more remote optimization settings 752A, or both. In one or more embodiments, a client device 710 can be a dedicated network device or electronic device, for example, a gaming device.

In one or more embodiments, a resource, for example, client device 710A, can comprise an optimizing service 704B. One or more remote optimization settings 752B can be stored as part of the optimizing service 704B, such as in a memory 610. The optimizing service 704B and the one or more remote optimization settings 752B of the client device 710A operate in the same or similar manner as that discussed with respect to the network resource 760. For example, the optimizing service 704B can receive one or more user inputs, for example, via user interface 711A, associated with the one or more optimization settings 752B and communicate those one or more optimization settings 752B to the optimizing agent 722 so as to update the one or more optimization settings 750.

The access point device 720 can comprise any one or more components of the representative computer system 600 of FIG. 6. The access point device 720 can be, for example, a gateway, an access point and/or a hardware electronic device that may be a combination modem and gateway that combines the functions of a modem, an access point (AP), and/or a router for providing content received from an internet service provider (not shown) to one or more network devices (e.g., wireless extender access point devices and client devices) in the network environment 700. In one or more embodiments, any one or more elements of the access point device 720 can comprise one or more distinct devices, for example, a router can be separate from the modem. It is also contemplated by the present disclosure that the access point device 720 can include the function of, but is not limited to, a universal plug and play (UPnP) simple network management protocol (SNMP), an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 720 may also be a residential gateway, a home network gateway, or a wireless access point (AP).

The access point device 720 can include an optimizing agent 722, a user interface 711D, and a memory 724. The optimizing agent 722 can receive an optimization notification from the user interface 711D. In one or more embodiments, the optimizing agent 722 can be within or part of a one or more distinct elements of the access point device 720, for example, as part of or within a router or a modem. In one or more embodiments, the optimizing agent 722 can perform any one or more steps or operations associated with identifying traffic for an optimization service flow.

The optimization notification can include one or more optimization settings 750, such as a priority level setting and a resource identifier. The resource identifier identifies a resource, such as a client application, a network device, or both, that should be associated with one or more optimization settings 750. The resource identifier can include a name, a unique identifier, an IP address, any other identifier, or a combination thereof. For example, a user can select via the user interface 711D or any other user interface 711 a client application 713, a client device 710, or any combination thereof. For example, a user could utilize user interface 711C or 711D to select a first resource, such as client application 713A. The selection can be associated with a higher QoS level so that traffic associated with the selection has a low-latency or a high bandwidth as compared to other client applications, network devices, or both. In one or more embodiments, the user interface 711C or 711D allows a user to select any one or more resources, for example, any one or more resources discussed with reference to FIG. 9.

The optimizing agent 722 can update or modify one or more optimization settings 750 associated with the selection. Updating or modifying the one or more optimization settings can include creating a new optimization setting associated with a resource, altering a current optimization setting associated with a resource, or any combination thereof. For example, modifying the one or more optimization settings can comprise associating the traffic associated of a first resource to a level of QoS based on a source port number to which this traffic is assigned. The level of QoS can be indicative of a policy of the one or more optimization settings, such as a level of QoS higher than that of one or more other resources. In one or more embodiments, modifying the one or more optimization settings can comprise associating the traffic of a second resource to a level of QoS based on a source port number to which this traffic is assigned. In this way, multiple resources can be identified for an optimized service flow. In one or more embodiments, the one or more optimization settings 750 are stored in the memory 724. The one or more optimization settings 750 can include a priority level, an identifier, a duration, a time/date, any other setting, or a combination thereof. The priority level can be any value. In one or more embodiments, the priority level indicates a QoS level. The identifier can be a unique identifier associated with a particular client application, network device, or both. The identifier can be associated with a group of client applications, network devices, or any combination thereof. A duration can indicate a length of time that the priority level is applied to traffic associated with the selection. The time/date can indicate a day of week, time of day or both that the priority level is applied to traffic associated with the selection. In one or more embodiments, the traffic associated with the first resource is directed or put on to the optimized service flow based on the one or more optimization settings 750. For example, the source port (sport) gets remapped to a different source port (nport). In one or more embodiments, specific DSCP markings of the traffic associated with the first resource are set based on the one or more optimizations settings 750.

In one or more embodiments, the optimizing agent 722 can send the one or more optimization settings 750 to an optimizing service 704A or an optimizing service 704B, collectively referred to as optimizing service 704. For example, the optimizing agent 722 can be sent to the optimizing service 704A of the network resource 760 via the optimizing service interface 702, so as to update the one or more remote optimization settings 752A. The optimizing service 704A can send the one or more remote optimization settings 752A to the access point device 720 to update the one or more optimization settings 750. In this way, the network resource 760 and the access point device 720 can synchronize the optimization of traffic flow. Similarly, the optimizing agent 722 can synchronize the one or more optimization settings 750 with the one or more remote optimization settings 752 via optimizing service 704B of the client device 710A using connection 701. The client device 710A can store the received one or more optimizations settings 750 from the optimizing agent 722 as the one or more remote optimization settings 752B.

In one or more embodiments, the access point device 720 can be connected via a connection 715 to a client device 710C. The access point device 720 can receive traffic associated with a client application 713C via the connection 715. The optimizing agent 722 of the access point device 720 can identify the traffic for an optimized service flow 728 to the network resource 760 such that the traffic receives a higher prioritization as compared to other traffic. Similarly, the optimizing service 704 will identify corresponding traffic from the network resource 760 for the optimized service flow 726 to the access point device 720.

In one or more embodiments, a user interface 711, such as user interface 711A, 711B or both, can interface with optimization service interface 702 to update or modify one or more remote optimization settings 752. For example, a user can be remote from access point device 720. The user can access the network resource 760 so as to update or modify one or more remote optimization settings 752 which can be sent or communicated to the access point device 720 to update the one or more optimization settings 750. In this way, a user can ensure that one or more resources of the network environment 700 can be associated with a desired priority level even when the user is remote from the access point device 720.

Figure 8:
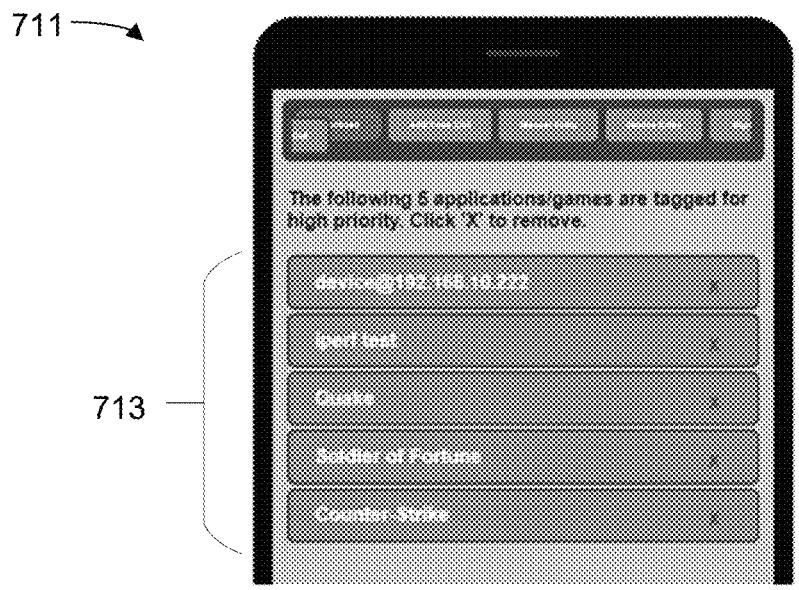
FIG. 8 is a graphical user interface for listing client applications associated with one or more optimization settings, according to one or more aspects of the present disclosure.

FIG. 8 is a graphical user interface 711 of a client device 710, for example, client device 710A, for listing client applications 713 associated with one or more remote optimizations settings 752, according to one or more aspects of the present disclosure. The user interface 711 of FIG. 8 illustrates several client applications 713 that are "tagged for high priority", for example, the client applications 713 can be associated with one or more optimization settings 752 that indicate that the client applications 713 are associated with a policy that indicates optimization or high priority. In one or more embodiments, the access point device 720 provides the client device 710 with a list of optimized client applications based on the one or more remote optimization settings 750. For example, the list of optimized client applications comprises one or more client applications 713 that are associated with one or more optimizations settings 750. The list of optimized client applications can include all of the one or more client applications 713 that a user has selected for optimizations, that are associated with one or more optimization settings 750, or both, such as discussed with reference to FIG. 9.

In one or more embodiments, any client application 713 can be, for example, a gaming application identifiable by a game name. An indicator "x" is used to denote or indicate that the client applications 713 listed are associated with one or more remote optimizations setting 752 and/or one or more optimization settings 750 that indicate a priority level higher than that of other applications, for example, a higher QoS level. Traffic associated with any of the listed client applications 713 is identified for an optimized service flow and will be put on an optimization flow such that the traffic experiences low-latency. A user can remove the associated high priority level for a client application 713 by selecting or clicking the indicator, for example, the "x". The client device 710 can send to the access point device 720, a network resource 760 or both, the selected client application 713 so as top update the one or more optimizations settings 750, the one or more remote optimizations settings 752 or both.

Figure 9:
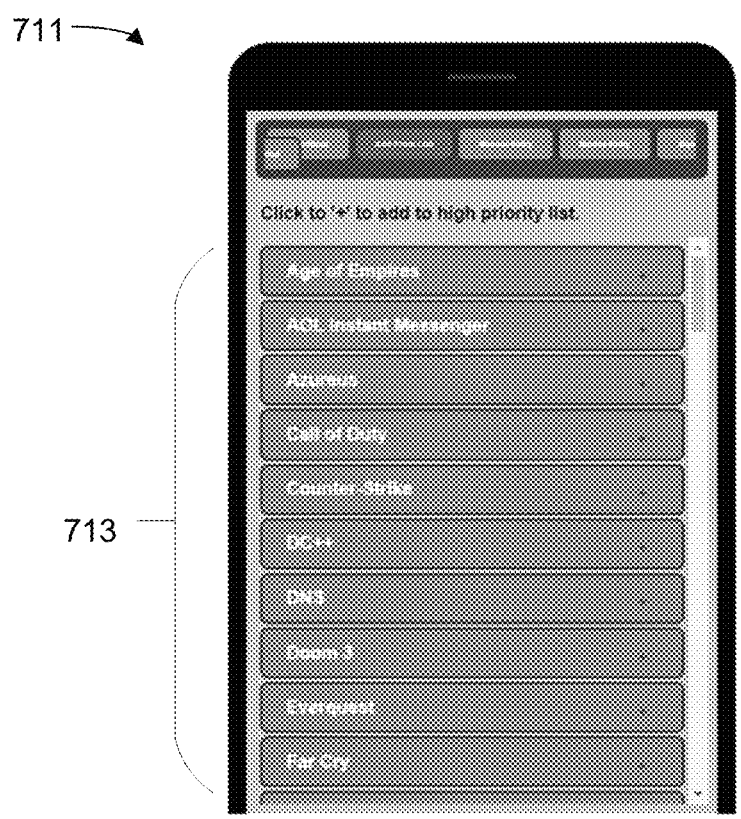
FIG. 9 is a graphical user interface for selecting one or more client applications associated with an optimization flow, according to one or more aspects of the present disclosure.

FIG. 9 is a graphical user interface 711 for selecting one or more client applications 713 associated with an optimization flow, according to one or more aspects of the present disclosure. The user interface 711 of FIG. 9 illustrates several client applications 713 as a list of non-optimized client applications. The list non-optimized client applications can include one or more client applications 713 that are available "to add to high priority list", for example, one or more of the client applications 713 that are available to be associated with one or more optimization settings 750. Once a client application 713 from the list of non-optimized client applications is selected, traffic associated with the selected client application 713 is identified for an optimization service flow. In one or more embodiments, the client device 710 can request from the access point device 720, a network resource 760, any other network device, or a combination thereof a list of non-optimized client applications. In one or more embodiments, the list of non-optimized client applications can comprise a predefined list, a dynamically acquired list, a list received from a network resource 760, a list generated based on one or more local settings of a client device 710, for example, a registry or basic input/output setting, one or more client applications 713 that are not associated with one or more optimizations settings 750, any other list, or any combination thereof. An indicator "+" is used to denote that the client applications 713 can be associated with one or more optimizations settings 750 that indicate a priority level higher than that of other applications, for example, a higher QoS level. A user can add the associated high priority level for a client application 713 or associate a client application 713 to one or more optimizations settings 750 by selecting or clicking the indicator, for example, the "+". The client device can send or provide an optimization notification to the access point device 720, the network resource 760, any other network device, or any combination thereof so as to update the one or more optimization settings 750, the one or more remote optimization settings 752 or both. The optimization notification can include the client application 713 selected, for example, by a user of the user interface 711, from the list of non-optimized client applications that should be associated with one or more optimization settings 750, for example, a policy that indicates a priority level setting. In one or more embodiments, the access point device 720 provides the list of optimized client applications to the client device 710. The list of optimized client applications includes the selected client application.

Figure 10A:
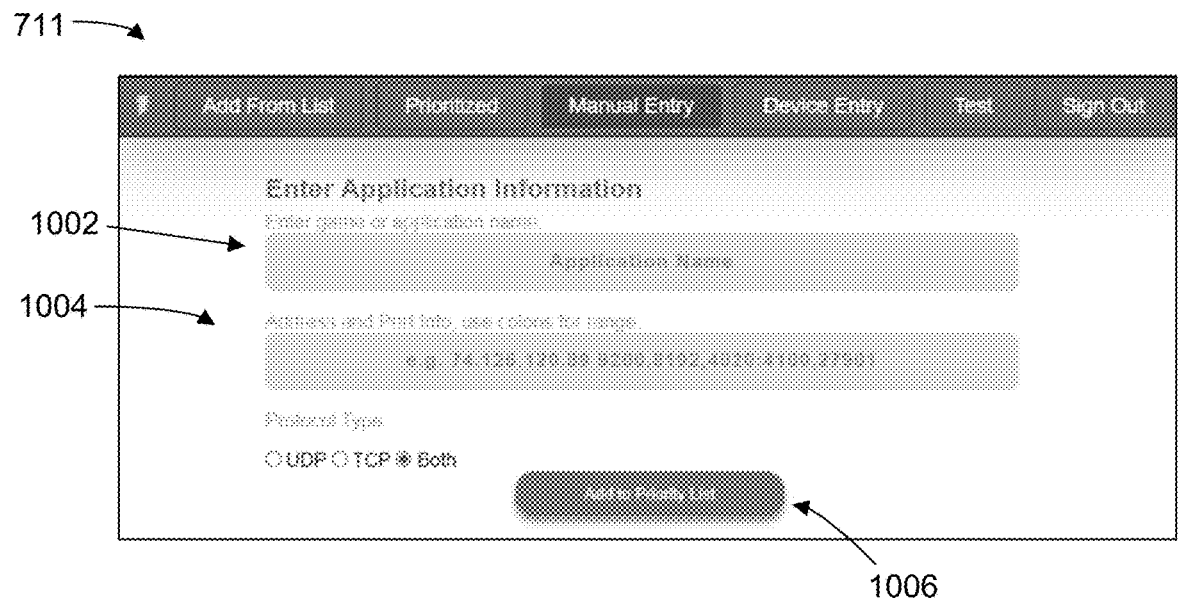
FIGS. 10A and 10B illustrate a graphical user interface for assigning a client application or network device as associated with an optimization flow, according to one or more aspects of the present disclosure.

FIG. 10A is a manual entry graphical user interface 711 for assigning a client application 713 as associated with an optimization flow, according to one or more aspects of the present disclosure. The user interface 711 of FIG. 10A illustrates user input fields 1002 and 1004. User input field 1002 allows a user to enter a name of a client application 713 and user input field 1004 allows a user to enter a server address indicating the address a client application uses, a port number, or both as a selection. A user can select or click the user input 1006 so that the selection can be associated with one or more optimization settings 750 so as to associate the client application 713 with a policy, for example, to receive a higher priority level than one or more other client applications. In one or more embodiments, the user interface 711 provides the user with a list of client applications 713 for selection, such as via a drop-down menu or any other user interface element, so that the selected client application 713 is associated with one or optimization settings 750, such as a policy.

Figure 10B:
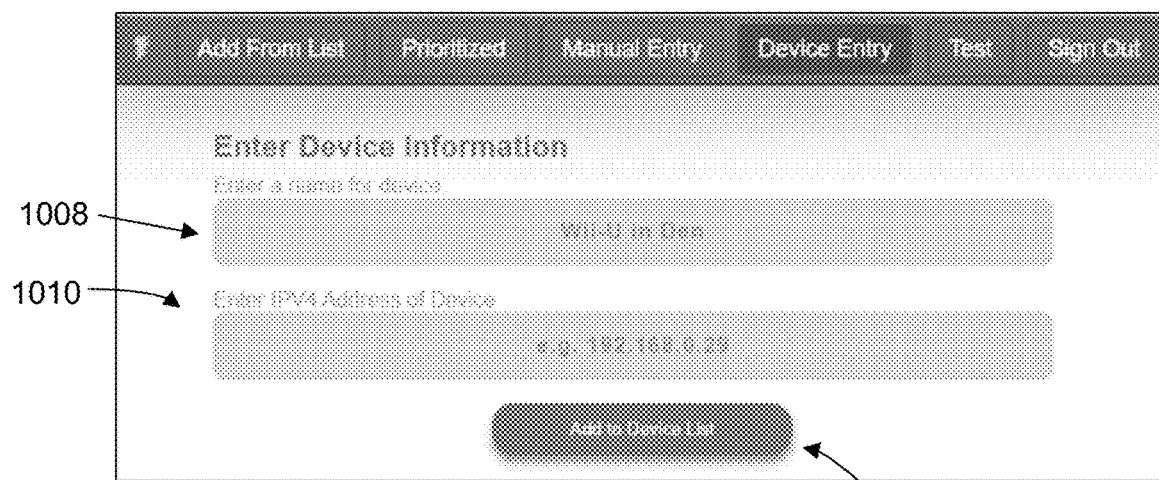

FIG. 10B is a manual entry graphical user interface 711 for assigning a client device 710 as associated with an optimization flow, according to one or more aspects of the present disclosure. The user interface 711 of FIG. 10B illustrates user input fields 1008 and 1010. User input field 1008 allows a user to enter a name of a client device 710 and user input field 1010 allows a user to enter an IP address as a selection. A user can select or click the user input 1012 so that the selection can be associated with one or more optimization settings 750 so as to associate the client device 710 with a policy, for example, to receive a higher priority level than one or more other network devices. In one or more embodiments, a user input field 1008 or 1010 could allow a user to enter a destination port, for example, that indicates a particular server. In one or more embodiments, the user interface 711 provides the user with a list of client devices 710 for selection, for example, via a drop-down menu or any other user interface element, so that the selected client device 710 is associated with one or optimization settings 750, such as a policy.

In one or more embodiments, a user can utilize the user interface of any of FIGS. 8, 9, 10A, and 10B to manage the priority level associated with one or more client applications 713, client devices 710, or any combination thereof. The client device 710 can send any changes made via the user interface 711 to the access point device 720 for updating the one or more optimization settings 750. In one or more embodiments, the user interface 711 is a web page that is served via the user interface 711D of the access point device 720 such that any changes made via the user interface 711 are reflected in the corresponding one or more optimization settings 750. For example, an update or change made via the user interface 711 causes one or more optimization settings 750 to be correspondingly updated or changed. The access point device 720 can update the one or more remote optimization settings 752 with any changes made to the one or more optimizations settings 750 in real-time, periodically, at timed intervals, based on any other criteria, or a combination thereof. In one or more embodiments, a user interface 711 can receive a voice command as discussed with respect to optimization interface 702 of FIG. 7.

In one or more embodiments, the optimizing service interface 702 of the network resource 760, the user interface 711D of access point device 720, or both can comprise any one or more features and perform any one or more functions of the graphical user interface 711 discussed with reference to FIGS. 8, 9, 10A, and 10B.

Figure 11:
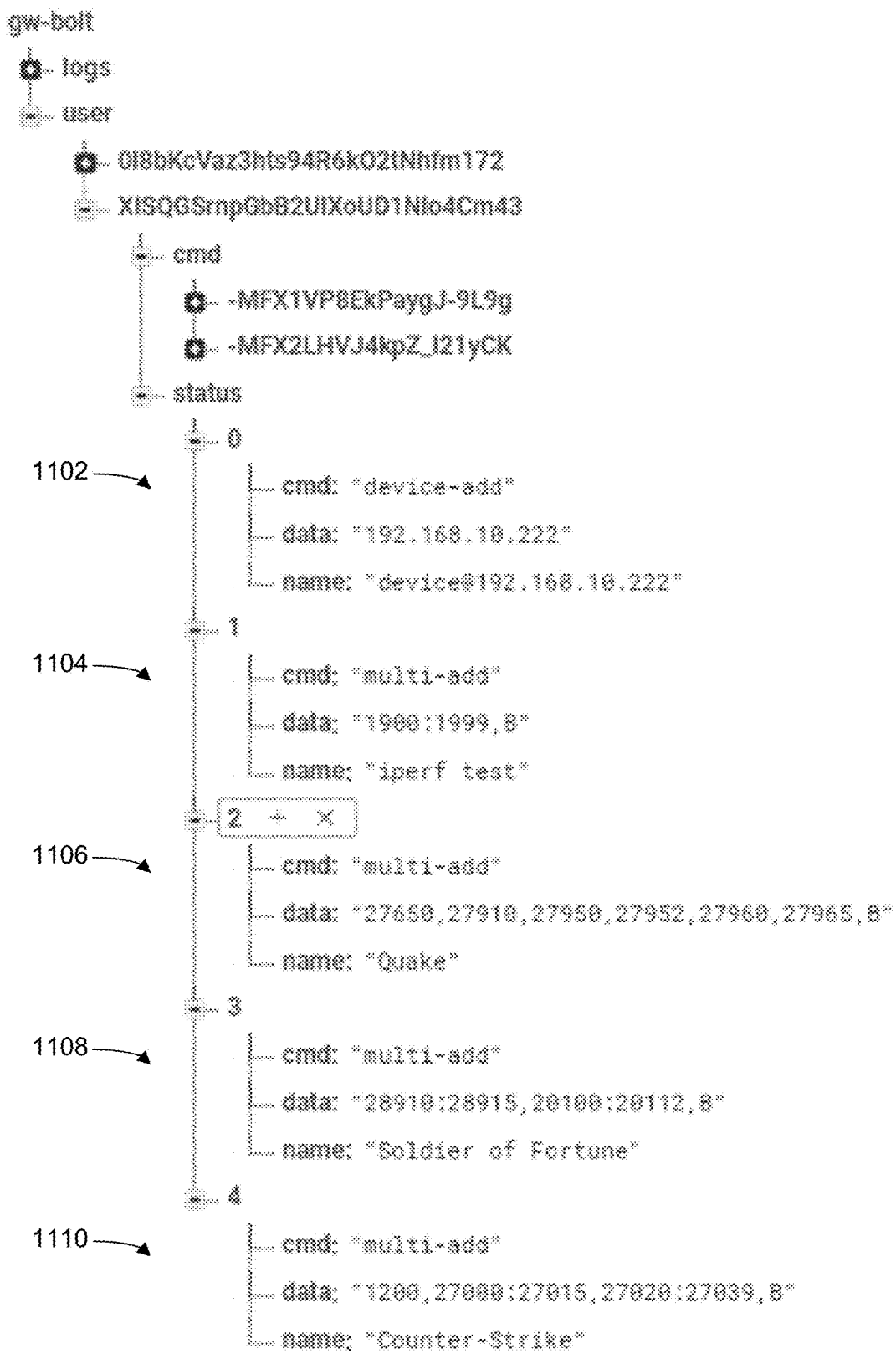
FIG. 11 is an optimization flow assignments, according to one or more aspects of the present disclosure.

FIG. 11 is an optimization flow assignments, according to one or more aspects of the present disclosure. FIG. 11 illustrates some of the structure of, for example, a cloud database such as a device name associated with a client device 710 at 1102 and client application identifiers associated with one or more client applications 713 at 1104, 1106, 1108 and 1110.

FIG. 11 illustrates a user/[UID]/cmd area. In this area one or more commands are written by the client application 713. The one or more commands are notified to the optimizing agent 722. The optimizing agent 722 reads the one or more commands, deletes the one or more commands, and makes any one or more settings adjustments to optimize as requested by the one or more commands. Once the settings are in effect, the optimizing agent writes to the status area which in turn notifies the client application 713 such that a user interface, for example, as illustrated in FIG. 8, can be presented or provided to a user. The status area is the cloud representation of one or more optimization settings 750.

At entry 1102, a device is identified by an IP address such that traffic associated with the IP address is identified for an optimized service flow. The name the user entered can be phrase of combination of one or more characters. For example, "device@192.168.10.222".

At entry 1104, an application to be optimized is identified as "iperf test". The optimization is based on one or more optimization settings 750, for example, a destination port falling within the range 1900-1999 and for both UDP and TCP protocols (indicated by the letter or character "B" at the end of the "data:" field.

At entries 1106, 1108 and 1110, each gaming application for optimization is named, for example, "Quake", "Soldier of Fortune", and "Counter-Strike", respectively. Any entry can include one or more single destination port as indicated by a single number, one or more ranges of ports as indicated by a numbers separated by a colon, or both as shown in the "data:" field. For example, at entry 1106, the ports 27650, 27910, 27950, 27960, and 27965 are provided, at entry 1108, ports 28910 through 28915 and 20100 through 20112 are provided, and at entry 1110 ports 1200, 27000 through 27015 and 27020 through 27039 are provided. As discussed with entry 1104, the "data:" field can end with a "B" indicating that both the UDP and the TCP protocols should be optimized. In one or more embodiments, the "data:" field can end with the letter or character "U" indicating that only the UDP protocol should be optimized or the letter or character "T" indicating that only the TCP protocol should be optimized.

Figure 12:
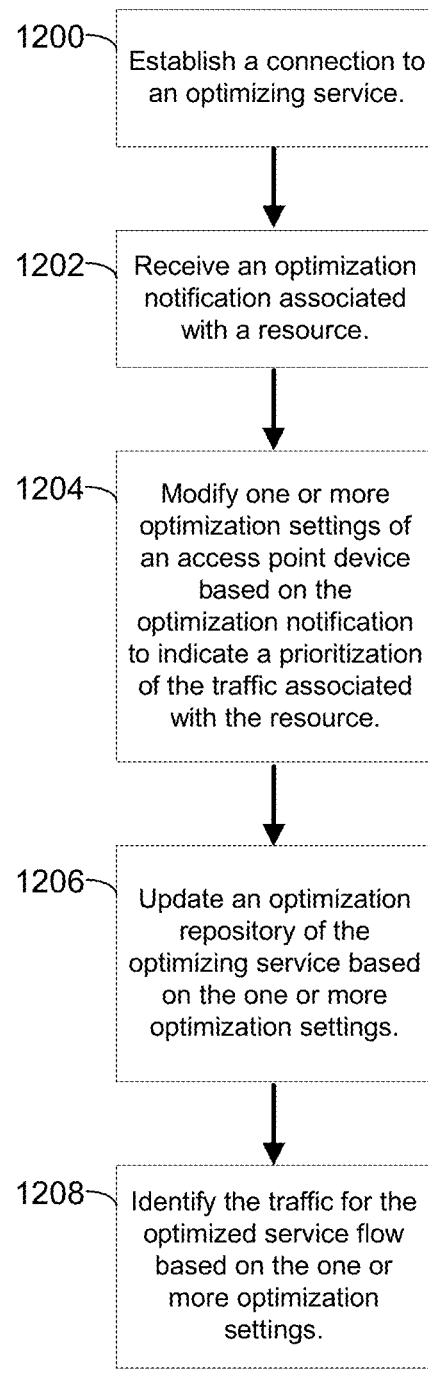
FIG. 12 is a flow diagram for an optimizing agent of an access point device to identify traffic associated with a resource for an optimized service flow, according to one or more aspects of the present disclosure.

FIG. 12 is a flow diagram for an optimizing agent 722 of an access point device 720 to identify traffic associated with a resource, such as an application or a network device, for an optimized service flow, according to one or more aspects of the present disclosure. In one or more embodiments, identifying the traffic for an optimized service flow includes the traffic being remapped to the optimized service flow by using the improved NAT process 200 discussed with reference to FIG. 2. In one or more embodiments, identifying the traffic for an optimized service flow includes making specific DSCP markings to the packets of the traffic associated with the resource so that the traffic can be identified for and/or directed to the optimized service flow. The access point device, the client device or any other network device or electronic device may be programmed with one or more computer-readable instructions that when executed by a controller or processor cause one or more operations according to FIG. 12. In FIG. 12, it is assumed that any one or more of the devices include their respective controllers and their respective software stored in their respective memories, as discussed above in connection with any of FIGS. 1-11, which when executed by their respective controllers perform the functions and operations in accordance with the example embodiments of the present disclosure (e.g., including performing a configuration of one or more network devices). While the steps S1200-1208 are presented in a certain order, the present disclosure contemplates that any one or more steps can be performed simultaneously, substantially simultaneously, repeatedly, in any order or not at all (omitted).

At step S1200, an access point device 720, for example, an optimizing agent 722 of the access point device 720, establishes a connection to an optimizing service 704, for example, hosted at a network resource 760, a client device 710, or both. The connection allows for bidirectional communication between the access point device 720 and the optimizing service 704, for example, via an optimizing service interface 702 over a connection 730 or any other interface over a connection 701.

At step S1202, the access point device 720, for example, an optimizing agent 722 of the access point device 720, receives an optimization notification associated with a resource. For example, the optimization notification can indicate that a resource should be added to or removed from one or more optimization settings 750. For example, the resource can be a client application 713, a client device 710, or both as discussed with reference to FIGS. 8, 9, 10A and 10B. The optimization notification can include one or more optimization settings 750, such as a priority level setting for the associated resource. In one or more embodiments, the priority level setting or a QoS level setting is indicative of a higher QoS level than that of one or more other resources. In one or more embodiments, the optimization notification can include a user input, such as a selection of a resource by the user as discussed with reference to FIGS. 7, 8, 9, 10A and 10B. In one or more embodiments, the user selection is based on a voice command such that the optimization notification comprises a voice command received from the user interface or a parameter indicative of the voice command.

At step S1204, the access point device 720, for example, an optimizing agent 722 of the access point device 720, modifies one or more optimization settings 750, for example, stored in a memory 724, based on the optimization notification. The modification indicates the prioritization of the traffic associated with the resource. For example, the traffic can be associated with a high QoS level so as to experience low-latency. Such low-latency may be required for the proper operation and functioning of a resource, for example, a gaming application or gaming device.

At step S1206, the access point device 720, for example, an optimizing agent 722 of the access point device 720, updates an optimization repository 706, for example, the optimization repository 706 of a network resource 760 based on the one or more optimization settings 750. Updating the optimization repository 706 can comprise updating one or more remote optimization settings 752 such that the one or more remote optimization settings 752 mirror or are synched with the one or more optimization settings 750 so that traffic associated with the resource is consistently provided optimization based on the one or more optimization settings 752, such as a policy. The policy can include a priority level setting, a bandwidth setting, a QoS level, any other policy setting, or a combination thereof.

At step 1208, the access point device 720, for example, an optimizing agent 722 of the access point device 720, identifies the traffic associated with the resource for the optimized service flow based on the one or more optimization settings 750. The source port can be modified to match the port range of the optimized service flow. In this way, any traffic associated with a resource can be designated or identified to be communicated at a higher QoS level or bandwidth so as to have a low-latency. For example, certain gaming applications require a high bandwidth to provide an enjoyable and enhanced user experience. The optimizing agent 722 ensures that the traffic associated with the resource experiences the priority level as indicated by the corresponding one or more optimization settings 750. In one or more embodiments, the traffic identified for the optimized service flow will be sent by the access point device 720 on the optimized service flow. That is, the traffic will take the optimized service flow as identified.

Techniques consistent with the present disclosure provide, among other features, systems and methods for a network having NAT capabilities which improves the QoS low latency prioritization. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A method for an optimizing agent of an access point device to provide traffic associated with a resource an optimized service flow, the method comprising:
    establishing a connection to an optimizing service;
    receiving, from the optimizing service, an optimization notification associated with the resource, wherein the optimization notification comprises one or more optimization settings;
    modifying one or more optimization settings of the access point device based on the optimization notification to indicate a prioritization of the traffic associated with the resource, wherein the one or more optimization settings comprise a priority level setting associated with the resource and a resource identifier that identifies the resource associated with the one or more optimization settings; and
    identifying the traffic for the optimized service flow based on the one or more optimization settings such that the traffic receives a higher prioritization as compared to other traffic.

2. The method of claim 1, wherein at least one of the one or more optimization settings comprises a policy associated with the resource.

3. The method of claim 1, further comprising:
    receiving a request from a client device for a list of non-optimized client applications;
    receiving an optimization notification from the client device, wherein the optimization notification comprises a selected client application from the list of non-optimized client applications; and
    providing a list of optimized client applications to the client device, wherein the list of optimized client applications includes the selected client application.

4. The method of claim 3, wherein the optimization notification is received from a user interface of the client device.

5. The method of claim 4, wherein the optimization notification comprises a voice command received from the user interface.

6. The method of claim 1, wherein modifying the one or more optimization settings comprises:
    associating the traffic of the resource to a level of Quality of Service (QoS).

7. The method of claim 1, wherein updating the one or more remote optimization settings comprises updating an optimization repository of a network resource.

8. An optimizing agent of an access point device for providing traffic associated with a resource an optimized service flow, comprising:
    a memory storing one or more computer-readable instructions;
    a processor configured to execute the one or more computer-readable instructions to:
        establish a connection to an optimizing service;
        receive, from the optimizing service, an optimization notification associated with the resource, wherein the optimization notification comprises one or more optimization settings;
        modify one or more optimization settings of the access point device based on the optimization notification to indicate a prioritization of the traffic associated with the resource, wherein the one or more optimization settings comprise a priority level setting associated with the resource and a resource identifier that identifies the resource associated with the one or more optimization settings; and
        identify the traffic for the optimized service flow based on the one or more optimization settings such that the traffic receives a higher prioritization as compared to other traffic.

9. The optimizing agent of claim 8, wherein at least one of the one or more optimization settings comprises a policy associated with the resource.

10. The optimizing agent of claim 8, wherein the processor is configured to execute one or more further instructions to:
    receive a request from a client device for a list of non-optimized client applications;
    receive an optimization notification from the client device, wherein the optimization notification comprises a selected client application from the list of non-optimized client applications; and
    provide a list of optimized client applications to the client device, wherein the list of optimized client applications includes the selected client application.

11. The optimization agent of claim 10, wherein the optimization notification is received from a user interface of the client device.

12. The optimization agent of claim 11, wherein the optimization notification comprises a voice command received from the user interface.

13. The optimization agent of claim 8, wherein modifying the one or more optimization settings comprises:
    associating the traffic of the resource to a level of Quality of Service (QoS).

14. The optimization agent of claim 8, wherein updating the one or more remote optimization settings comprises updating an optimization repository of a network resource.

15. A non-transitory computer-readable medium storing one or more instructions for identifying traffic associated with a resource an optimized service flow, which when executed by a processor of an access point device, cause the access point device to perform one or more operations to:
    establish a connection to an optimizing service;
    receive, from the optimizing service, an optimization notification associated with the client application, wherein the optimization notification comprises one or more optimization settings;
    modify one or more optimization settings of the access point device based on the optimization notification to indicate a prioritization of the traffic associated with the resource, wherein the one or more optimization settings comprise a priority level setting associated with the resource and a resource identifier that identifies the resource associated with the one or more optimization settings; and
    identify the traffic for the optimized service flow based on the one or more optimization settings such that the traffic receives a higher prioritization as compared to other traffic.

16. The non-transitory computer-readable medium of claim 15, wherein at least one of the one or more optimization settings comprises a policy associated with the resource.

17. The non-transitory computer-readable medium of claim 15, wherein the one or more instructions when further executed by the processor cause the access point device to further perform the one or more operations to:
    receive a request from a client device for a list of non-optimized client applications;
    receive an optimization notification from the client device, wherein the optimization notification comprises a selected client application from the list of non-optimized client applications; and
    provide a list of optimized client applications to the client device, wherein the list of optimized client applications includes the selected client application.

18. The non-transitory computer-readable medium of claim 17, wherein at least one of:
    the optimization notification is received from a user interface of the client device; and
    the optimization notification comprises a voice command received from the user interface.

19. The non-transitory computer-readable medium of claim 15, wherein modifying the one or more optimization settings comprises:
    associating the traffic of the resource to a level of Quality of Service (QoS).

20. The non-transitory computer-readable medium of claim 15, wherein updating the one or more remote optimization settings comprises updating an optimization repository of a network resource.

* * * * *